US012643120B2

(12) United States Patent (10) Patent No.: US 12,643,120 B2
Walter et al. (45) Date of Patent: Jun. 2, 2026

(54) VALVE FOR FLOWABLE MEDIA

(71) Applicant: Focke & Co. (GmbH & Co. KG), Verden (DE)

(72) Inventors: Jan-Christian Walter, Bardowick (DE); Dennis Bolten, Norderstedt (DE); Nils Neuhaus, Buxtehude (DE); Martin Eilts, Neu Wulmstorf (DE)

(73) Assignee: Focke & Co. (GmbH & Co. KG), Verden (DE)

( * ) Notice: Subject to any disclaimer, the term of this patent is extended or adjusted under 35 U.S.C. 154(b) by 37 days.

(21) Appl. No.: 18/007,500

(22) PCT Filed: Jul. 27, 2021

(86) PCT No.: PCT/EP2021/071055
§ 371 (c)(1),
(2) Date: Jan. 31, 2023

(87) PCT Pub. No.: WO2022/028965
PCT Pub. Date: Feb. 10, 2022

(65) Prior Publication Data
US 2023/0278065 A1 Sep. 7, 2023

(30) Foreign Application Priority Data
Aug. 3, 2020 (DE) .......................... 102020120439.6

(51) Int. Cl.
*F16K 41/10* (2006.01)
*B05C 5/02* (2006.01)
(Continued)

(52) U.S. Cl.
CPC .......... *B05C 5/0225* (2013.01); *B05C 5/0279* (2013.01); *F16K 1/38* (2013.01); *F16K 31/0655* (2013.01); *F16K 41/10* (2013.01)

(58) Field of Classification Search
CPC .. F16K 41/10; F16K 31/1221; F16K 31/0655; F16K 1/38; B05C 5/0225; B05C 5/0279; B05C 5/0237
(Continued)

(56) References Cited

U.S. PATENT DOCUMENTS 2,331,503 A * 10/1943 Ray ......................... F16K 41/10
251/80
4,201,366 A * 5/1980 Danko .................... F16K 51/02
137/329.01
(Continued)

FOREIGN PATENT DOCUMENTS

CN 203940059 U 11/2014
DE 3225856 A1 1/1984
(Continued)

OTHER PUBLICATIONS

WIPO, International Search Report (in parent application), Jan. 10, 2022.
(Continued)

*Primary Examiner* — Charles P. Cheyney
(74) *Attorney, Agent, or Firm* — Laurence P. Colton; Smith Tempel Blaha LLC

(57) ABSTRACT

A valve for flowable media having a valve housing and an elongate closure member arranged therein and which can be axially moved in a medium channel of the valve by a controllable actuator and which in a closed position abuts a valve seat and closes a discharge opening connected to the medium channel, and which is connected to a sealing element to seal the medium channel, namely, a part-piece of an elongate bellows, which moves in an axial direction during movements of the closure member and which is a hollow member made of metal, wherein another part-piece of the bellows is fixedly supported in the valve. The relative axial position between the bellows and the valve seat is
(Continued)

adapted to a production-related deviation of the longitudinal dimension of the bellows used from a desired longitudinal dimension so that this deviation is compensated for.

20 Claims, 5 Drawing Sheets

(51) Int. Cl.
    *F16K 1/38*        (2006.01)
    *F16K 31/06*      (2006.01)

(58) Field of Classification Search
    USPC ..................... 251/335.3, 63.5, 63.6; 222/545
    See application file for complete search history.

(56) References Cited

U.S. PATENT DOCUMENTS

| | | | | |
|---|---|---|---|---|
| 4,348,005 A * | 9/1982 | Eaton | ..................... | F16K 41/10 251/264 |
| 4,515,344 A * | 5/1985 | Gemignani | ............. | F16K 41/10 251/63.5 |
| 4,804,164 A * | 2/1989 | Nakazawa | ........ | F16K 31/52408 138/46 |
| 4,815,692 A * | 3/1989 | Loiseau | .................. | F16K 1/307 251/63.5 |
| 4,874,014 A * | 10/1989 | Grant | ..................... | F16K 11/22 137/884 |
| 4,995,589 A * | 2/1991 | Adishian | ............. | F16K 31/1221 251/63.5 |
| 5,351,936 A * | 10/1994 | Tanikawa | ................ | F16K 41/10 251/278 |
| 5,474,303 A * | 12/1995 | Coles | ...................... | F16K 41/10 277/636 |
| 5,634,627 A * | 6/1997 | Daido | .................... | F16K 41/10 251/63.6 |
| 5,678,803 A * | 10/1997 | Shinohara | ............... | F16K 41/10 251/368 |
| 6,343,721 B1 | 2/2002 | Breault | | |
| 6,786,248 B2 * | 9/2004 | Johnson | .................. | B67C 3/281 141/90 |
| 2003/0052293 A1 * | 3/2003 | Enzaki | ............... | F16K 31/1221 251/291 |
| 2004/0232369 A1 * | 11/2004 | Kajitani | .................. | F16K 51/02 137/625.3 |
| 2017/0292633 A1 * | 10/2017 | Hill | ......................... | F16K 41/10 |
| 2018/0135776 A1 * | 5/2018 | Kim | .......................... | F16K 1/48 |
| 2019/0388912 A1 | 12/2019 | Kader | | |
| 2020/0222921 A1 | 7/2020 | Ineichen | | |

FOREIGN PATENT DOCUMENTS

| | | | |
|---|---|---|---|
| DE | 102004001505 A1 | 8/2005 | |
| DE | 102009032308 A1 | 1/2011 | |
| WO | 2009019036 A1 | 2/2009 | |

OTHER PUBLICATIONS

Deutsches Patent—Und Markenamt (German Patent and Trademark Office), Recherchebericht (search in a related application), Jun. 30, 2021.

China National Intellectual Property Administration, Notification of the First Office Action (in a corresponding application), Apr. 30, 2025.

\* cited by examiner

*Fig. 3*

VALVE FOR FLOWABLE MEDIA

CROSS REFERENCE TO RELATED APPLICATIONS

This application is the US national phase of and claims the benefit of and priority on International Application No. PCT/EP2021/071055 having an international filing date of 27 Jul. 2021, which claims priority on and the benefit of German Patent Application No. 10 2020 120 439.6 having a filing date of 3 Aug. 2020.

BACKGROUND OF THE INVENTION

Technical Field

The present invention relates to a valve for flowable media, in particular for fluid adhesive or glue, having a valve housing and an elongate closure member which is arranged in the valve housing and which can be axially moved in a medium channel of the valve by a controllable actuator and which in a closed position abuts a valve seat and closes a discharge opening, which is connected to the medium channel, and which is raised from the valve seat in an open position and releases it.

In this case, the valve can also additionally be connected to a sealing element for sealing the medium channel, that is to say, an elongate bellows which also moves in an axial direction during movements of the closure member and which is in particular in the form of a hollow member and which is preferably made of metal.

Prior Art

Such valves are known. Over their service-life, the closure members carry out during operation a large number of opening and closing movements (up to several hundred million movements). In this regard, a bellows which is generally produced from metal is provided as a sealing element and thus it will generally be connected to the closure member at an end piece of the closure member and will be supported in a fixed manner in the valve at the other end piece. Accordingly, it will also be moved during the axial movements of the closure member, that is to say, it is expanded and contracted alternately at a high frequency, which accordingly has a negative effect on the maximum service-life of such a bellows.

BRIEF SUMMARY OF THE INVENTION

An object of the present invention is to further develop a valve of the type mentioned in the introduction.

This object is achieved by a valve for flowable media, in particular for fluid adhesive or glue, having a valve housing and an elongate closure member which is arranged in the valve housing and which can be axially moved in a medium channel of the valve by a controllable actuator and which in a closed position abuts a valve seat and closes a discharge opening, which is connected to the medium channel, and which is raised from the valve seat in an open position and releases it, and which is connected to a sealing element in order to seal the medium channel, that is to say, a part-piece of an elongate bellows, which also moves in an axial direction during movements of the closure member and which is in particular in the form of a hollow member and which is preferably made of metal, wherein another part-piece of the bellows is fixedly supported in the valve, characterized in that the relative axial position between the bellows and the valve seat is adapted to a production-related deviation of the actual longitudinal dimension of the bellows used from a desired longitudinal dimension (production tolerance) so that this deviation is completely or partially compensated for.

This object also is achieved by a valve for flowable media, in particular for fluid adhesive or glue, preferably as disclosed above, having a valve housing and an elongate closure member which is arranged in the valve housing and which can be axially moved in a medium channel of the valve by a controllable actuator and which in a closed position abuts a valve seat and closes a discharge opening which is connected to the medium channel, and which is raised from the valve seat in an open position and releases it, characterized in that the closure member has an end which abuts the valve seat in a sealing manner in a closed position on the valve seat and from which the closure member extends through the medium channel, and a (an additional) end which is arranged at the other side of the medium channel and in the region of which the closure member is radially supported by means of a particularly cap-like guide member which is connected thereto in a rotationally secure manner and which is arranged in a fixed sliding bearing bush of the valve and can be moved axially in the sliding bearing bush with sliding abutment against the sliding bearing bush.

In the event that a bellows is used as a sealing element, the valve is particularly intended to be further developed in that the service-life of the bellows used is optimized.

A valve according to the present invention is accordingly characterized in that the relative axial position between the bellows and the valve seat is adapted to a production-related deviation of the actual longitudinal dimension of the bellows used from a desired longitudinal dimension (production tolerance) so that this deviation is completely or partially compensated for.

It has been recognized according to the invention that the longitudinal tolerances of the bellows lead, during the production thereof (production tolerance), to high, undesirable force introductions being brought about in the valve or particularly in the bellows during operation of the valves in the prior art. This is because the sets of bellows during the production of the valve are each used in the valve in the respective installation space as a result of the tolerances thereof in an undesirable manner under a pretension which has a negative effect on the service-life thereof (either compressed or pulled apart). As a result of the high spring constant of the bellows, undesirable, tolerance-related redirections of the respective resilient bellows then bring about a relatively high, undesirable introduction of force.

The adaptation according to the invention of the relative axial position between the bellows and the valve seat compensates for this undesirable deviation so that no more undesirable introductions of force occur or only substantially smaller ones which do not have a negative influence on the service-life of the respective bellows. In other words, the position of the bellows and/or the valve seat in the valve housing, which position is initially determined structurally in accordance with a desired longitudinal dimension of the bellows, is adapted during production of the valve to the instantaneous actual longitudinal dimension of the bellows being used.

There are various possible ways of carrying out such adaptation. Thus, in a first preferred embodiment of the invention, in order to compensate for the deviation between the actual longitudinal dimension and desired longitudinal dimension of the bellows, a compensation means which influences the relative axial position between the bellows and the valve seat can be used. This may be a preferably annular spacer piece.

For example, a spacer piece which is arranged between a receiving member, which is arranged in the valve housing and which is connected to the bellows in a fluid-tight manner or which is fixed thereto, for the bellows and a (fixed) support face which is particularly circumferential, preferably in a transversely axial plane, of the valve housing or in the valve housing, on which support face this receiving member is supported or is borne.

Alternatively, the position of the valve seat in the housing could also be changed by such a spacer piece which is arranged, for example, between a support face, which is arranged in the valve housing, for the valve seat and a particularly circumferential support face, which is preferably arranged in a transversely axial plane, of the valve housing or in the valve housing, on which support face the valve seat is supported or is borne.

Furthermore, there could also be provision for the deviation between the actual longitudinal dimension and the desired longitudinal dimension of the bellows to be completely or partially compensated for via an adapted positioning of the fluid-tight connection of the bellows and the bellows receiving member or an adapted positioning of the fixing of the bellows to the bellows receiving member, for example, by changing the positioning of welding spots or welding lines, with which the bellows is fixed to the bellows receiving member.

In this case, the thickness of the spacer piece used in each case can be selected so that precisely the deviation between the desired longitudinal dimension and the actual longitudinal dimension of the bellows is compensated for, that is to say, for example, corresponds to this deviation.

With regard to the bellows, it can be arranged or can extend in the medium channel coaxially relative to a, particularly rod-shaped, part-piece, which is arranged in the medium channel, of the closure member.

The above-mentioned part-piece of the closure member may preferably be arranged in the internal bellows space of the bellows.

In another embodiment of the concept according to the invention, the medium channel can be delimited in the valve at one end, which is remote from the valve seat, by a wall which particularly extends in a transversely axial manner and in which a through-opening, along which the closure member is guided out of the medium channel, is constructed. In this case, in order to seal the region between the closure member and the wall, which surrounds it, of the through-opening, the bellows can surround a or the particularly rod-shaped part-piece of the closure member which is arranged in the medium channel and which extends at least as far as the through-opening, wherein the fixedly supported part-piece of the bellows, that is to say, a first, particularly hollow-cylindrical end piece thereof, is connected, in particular welded, in a fluid-tight manner to a particularly circumferential connection face, which is associated with the through-opening, of the wall, and wherein the part-piece, which is connected to the closure member, of the bellows, that is to say, a second, particularly hollow-cylindrical end piece thereof, is connected, in particular welded, in a fluid-tight manner to the part-piece of the closure member.

With regard to the circumferential connection face of the wall, to which the first end piece of the bellows is connected in a fluid-tight manner, it can (radially) surround the through-opening. In particular, it can extend coaxially relative to the first end-piece.

Preferably, the second end-piece of the bellows can externally abut a circumferential connection face of the particularly rod-shaped part-piece of the closure member and can be connected, in particular welded, thereto in a fluid-tight manner.

The fluid-tight connection of the first end piece of the bellows to the connection face of the wall and/or the connection of the second end piece of the bellows to the part-piece of the closure member, in particular to the connection face of the part-piece, may preferably be in the form of a laser welding connection.

The particularly transversely axially extending wall may be a wall of the bellows receiving member.

The through-opening can extend coaxially relative to the particularly rod-shaped part-piece of the closure member which is guided through the through-opening.

In another embodiment of the present invention, the bellows receiving member can be integrally connected to the valve housing. Alternatively, the bellows receiving member may also be a separate component which is arranged in the valve housing.

Preferably, in the closed position of the valve, the bellows is positioned under a pretension which is sought or desired in the medium channel, in particular in a state redirected or compressed with respect to a tension-free position. In this case, this pretensioning is preferably selected to be substantially less (at least 90% less) than the pretensioning which results in the prior art as a result of the above-indicated, undesirable, non-compensated deviation of the actual longitudinal dimension of the bellows from the desired longitudinal dimension. Accordingly, the force introduction, which is brought about by this desired pretensioning, into the valve or the bellows is very small and the resultant service-life reduction is negligible.

There may advantageously be provision for a closing force member of the valve, in particular a spring, to apply in the closed position of the valve a closing force, which acts in the direction of the valve seat, to the closure member, and, however, for the bellows to apply to the closure member in the closed position of the valve in order to support a subsequent, opening movement, which is brought about by the opening force of an opening force member, in particular the controllable actuator, an (additional) opening force which is brought about particularly by the above-mentioned, desired pretensioning and which acts counter to the closing force and which is smaller with respect thereto.

There may further be provision for an opening force member of the valve, in particular the controllable actuator, to apply to the closure member, in an open position of the valve, an opening force which is particularly directed counter to the closing force of a or the closing force member, and for the bellows to apply a (an additional) closing force, which is directed counter to the opening force and which is brought about in particular by the above-mentioned desired pretensioning and which is smaller than the opening force, in order to support a subsequent closing movement, which is brought about by the closing force member of the valve, of the closure member.

There may further be provision for the parameters of the valve, in particular of the closure member, the medium channel, the valve seat and/or the bellows to be selected including the respective installation positions and dimensions so that a tension-free state of the bellows which also moves with the closure member is produced at an open position of the closure member corresponding to half the travel length of the closure member.

With regard to the wall of the bellows, it can be constructed with multiple layers, in particular two layers.

According to another embodiment of the invention, the controllable actuator with which the closure member is axially movable may comprise an electromagnet with a coil, the core or armature of which forms the closure member or an armature portion which is connected to the closure member, wherein the closure member extends in the valve housing from an end of the closure member in abutment with the valve seat in the closed position, through the medium channel and through the space which is surrounded by the coil, as far as a region at the other side of the coil.

The closure member can be radially guided with at least two guides, that is to say, on the one hand, with a first guide which is arranged adjacent to the valve seat in the medium channel and, on the other hand, with a second guide which is arranged in the region at the other side of the coil.

In this case, the first guide and/or the second guide can preferably be or have a guide member having a preferably disk-like, transversely axially extending guide member portion, in which a (an axial) guide member through-opening, through which the closure member extends, is located.

Furthermore, the transversely axially extending guide member portion of the guide member of the first guide may have one or more additional (axial) through-openings, through which medium of the medium channel can flow in the direction of the valve seat.

An independent special feature of the valve which may also advantageously be used independently of the above embodiments and which is in particular independent of use of a bellows but which may naturally also be combined with one or more of the above embodiments or features, relates to the bearing or guiding of the closure member in the valve disclosed herein, in particular by the second guide.

A valve according to the invention having the above features is characterized in that the closure member has an end which abuts the valve seat in a sealing manner in a closed position and from which the closure member extends through the medium channel, and a (an additional) end which is arranged at the other side of the medium channel and in the region of which the closure member is radially supported by means of a particularly cap-like guide member which is connected thereto in a rotationally secure manner and which is arranged in a fixed sliding bearing bush of the valve and can be moved axially in the sliding bearing bush with sliding abutment against the sliding bearing bush.

In this case, the guide member which is connected to the closure member in a rotationally secure manner can further be the guide member of the above-mentioned second guide.

It has been found according to the invention that the above-mentioned type of bearing of the closure member allows particularly long service-lives of the valve or particularly many closure member travel actions before substantial wear occurs.

According to another embodiment of this notion, the guide member which is connected to the closure member in a rotationally secure manner can be located or arranged on the armature portion in a rotationally secure manner with abutment against the armature portion.

The guide member can preferably be made from high-grade steel, in particular from high-grade steel 1.4112 or a high-grade steel with comparable properties.

The fixed sliding bearing bush can again completely or partially comprise a copper alloy with or without aluminum, such as aluminum bronze, or completely or partially comprise steel or high-grade steel.

It is also conceivable for the fixed sliding bearing bush to have a carrier layer or back layer made from steel or high-grade steel and a running layer made from a polymer.

BRIEF DESCRIPTION OF THE DRAWINGS

Additional features of the present invention will be appreciated from the appended patent claims, the following description of preferred embodiments and the appended drawings, in which:

Figure 3:
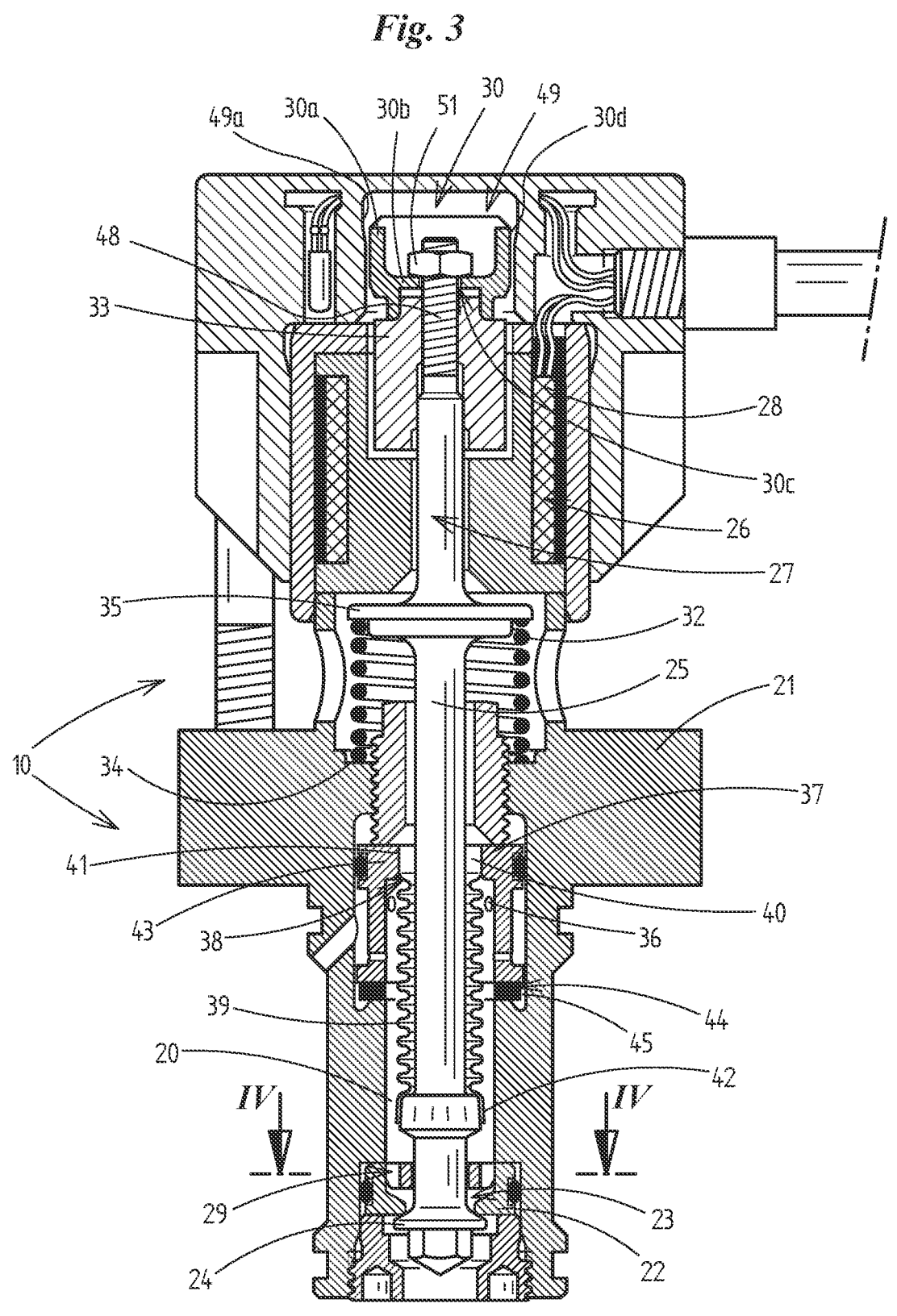

FIG. 3 shows a section through an individual valve of the valve arrangement.

DETAILED DESCRIPTION OF PREFERRED EMBODIMENTS

Figure 1:
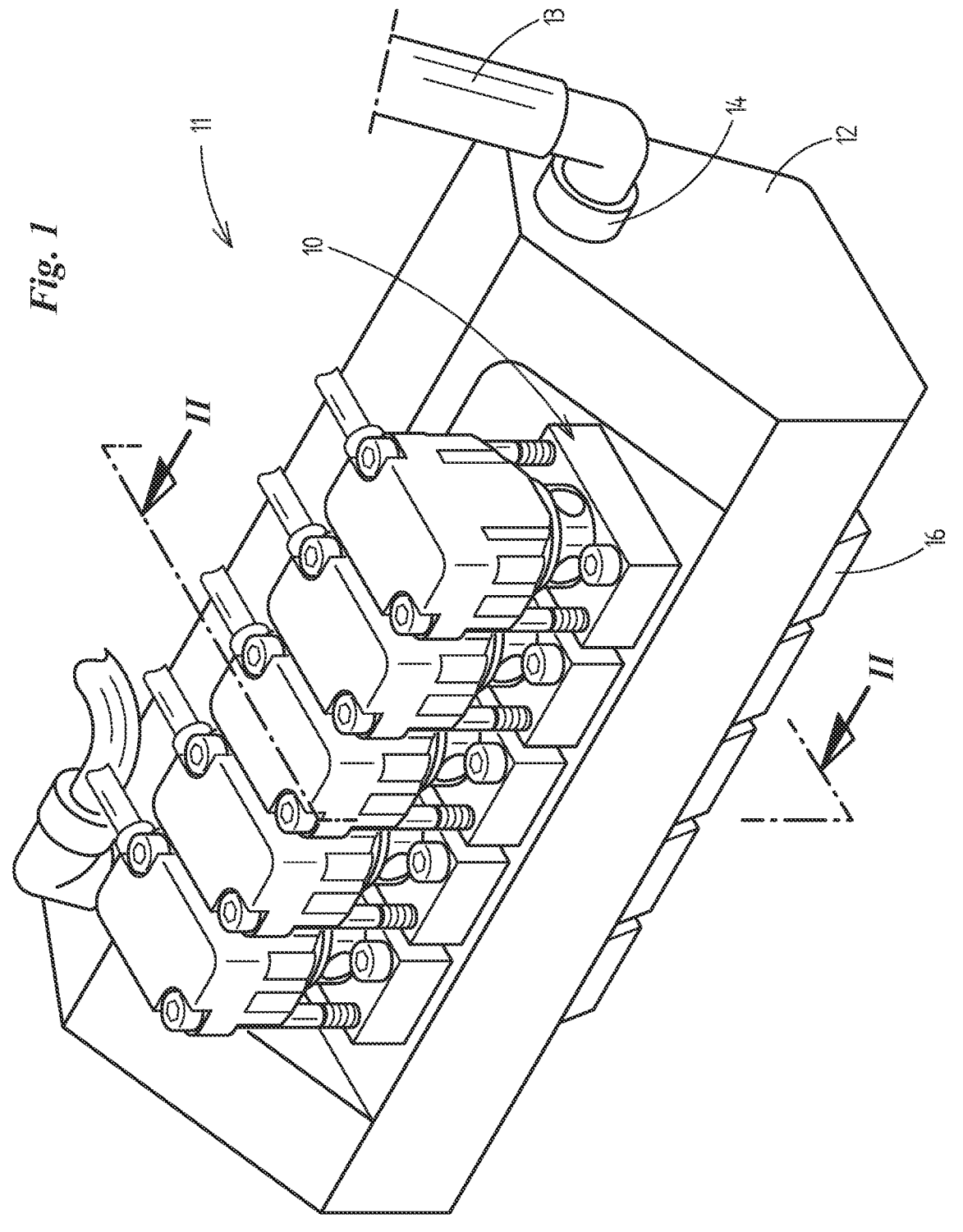
FIG. 1 shows an oblique view of a valve arrangement having a plurality of valves according to the invention which are arranged on a distributor member of a valve arrangement.
Figures 2, 4:
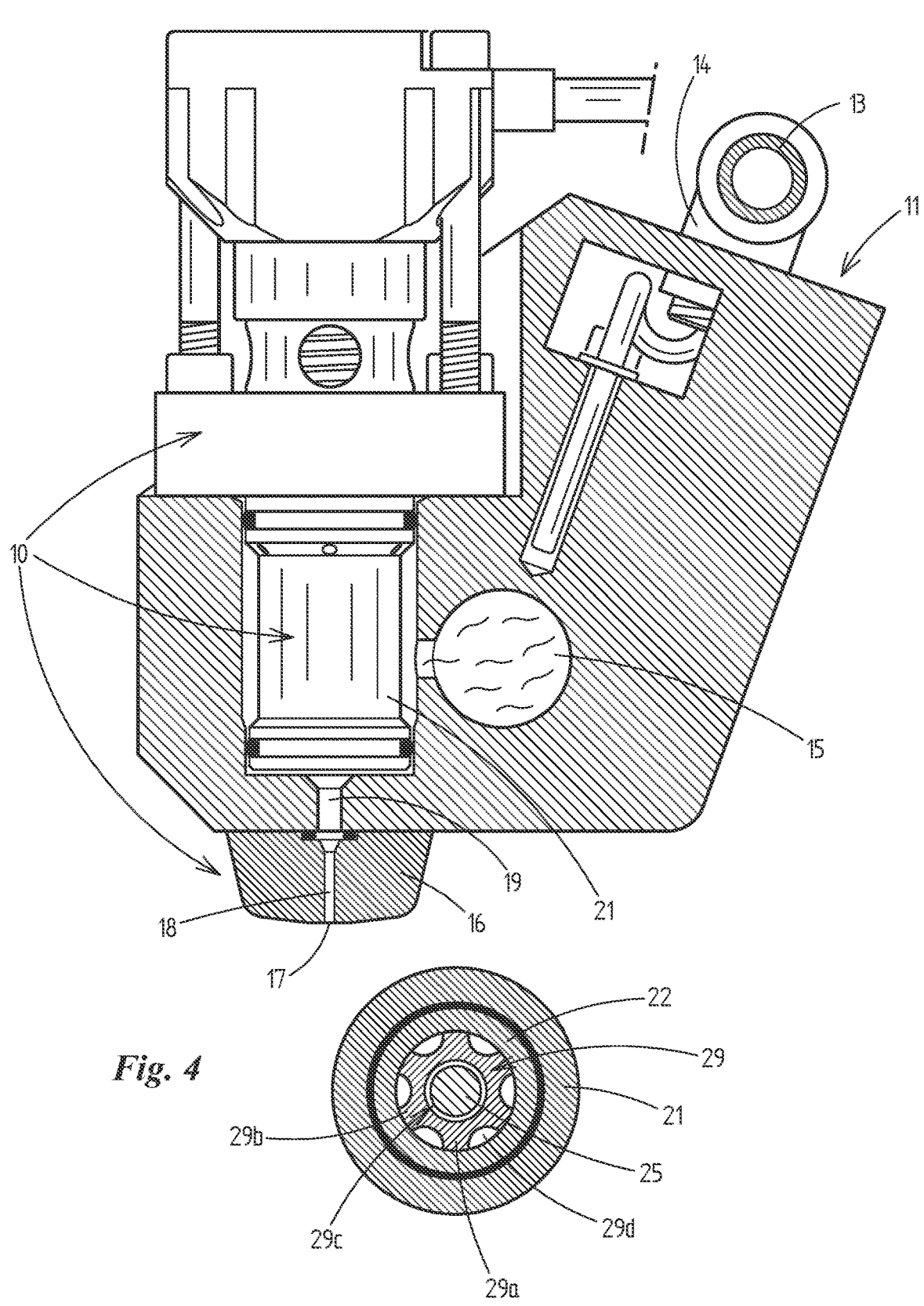
FIG. 2 shows a section through the valve arrangement along the line of section II-II in FIG. 1.
FIG. 4 shows a section through the valve along the line of section IV-IV in FIG. 3.

A valve 10 according to the invention is shown in the present embodiment as part of a valve arrangement 11. However, this does not have to be the case. Similarly, the invention also comprises individual valves.

In this case, this is a valve arrangement 11 with which a fluid medium, such as, for example, adhesive (hot melt adhesive or cold adhesive) can be applied to substrates, for instance, to blanks for cigarette packets or the like. However, such a valve arrangement 11 can naturally also be used for other substrates.

In a manner known per se, a plurality of individual valves 10 are arranged on the valve arrangement 11, in the present case five valves 10. More specifically, the individual valves 10 are fixed to a common distributor member 12 of the valve arrangement 10, to which distributor member 12 the fluid medium is supplied via a supply line 13 from a medium source which is not shown.

In this case, the supply line 13, for example, a hose, opens into a medium inlet 14 of the valve member 12 which is connected to medium channels 15 which are arranged in the distributor member 12 in a fluid-conducting manner and to which the individual valves 10 are each connected so that the fluid medium is supplied to them via the medium channels 15.

Each valve 10 has in the present case a nozzle 16 which is arranged on the distributor member 12, in particular on the lower side thereof, and via which, that is, via a discharge opening 17 thereof, the fluid medium is discharged onto the substrate.

The discharge opening 17 of the nozzle 16 is located in this case at the end of a nozzle channel 18 which again adjoins a medium channel 19 in the distributor member 12 in an upstream direction, to which channel fluid medium is supplied in portions from a medium channel 20 which is arranged in a housing 21 of the valve 10.

The fluid medium is supplied to this medium channel 20 of the valve 10 from the medium channel 15, which is accordingly arranged upstream, of the distributor member 12 via inlet openings 36 which open into the medium channel 20.

In order to discharge the fluid medium in portions from the medium channel 20 of the valve 10 into the medium channel 19 of the distributor member, the valve 10 has an elongate closure member 25 which can be moved axially back and forth and which can be moved in the medium channel 20 and which, in a closed position, closes a discharge opening 23 which is connected to the medium channel 20 of the valve 10, cf. FIGS. 3-6, and releases it in an open position (not shown).

The discharge opening 23 is part of a valve seat 22 of the valve 10 with a particularly (circular) ring-like abutment face or sealing face in the present case for a closure piece 24 which forms a first end of the closure member 25.

In the closed position of the closure member 25, this first end or this closure piece 24 abuts in a sealing manner against the valve seat 22 or the abutment face thereof.

In the open position of the closure member 21, it or the closure piece 24 lifts off the valve seat 22, in the present case in a downward direction, and releases the discharge opening 23 in this case.

The closure member 25 extends in the housing 21 of the valve 10 from the end thereof formed by the closure piece 24 through the medium channel 20 and through an internal space 27, which is surrounded by a coil 28 of an electromagnet 26, as far as a region at the other side of the coil 28.

The closure member 25 is radially supported in the housing 21 by means of a first guide 29, which is arranged adjacent to the valve seat 22 in the medium channel 20, and a second guide 30, which is arranged at the other side of the coil 28, so that it can carry out (only) axial back and forth movements.

In this case, the first guide 29 has a guide member 29a which extends transversely axially along the medium channel 20 and which has a guide member portion 29b which is arranged in a transversely axial plane and in which a central guide member through-opening 29c (which extends axially) through which the closure member 25 extends is located.

The guide member portion 29b further has additional through-openings 29d (at the periphery) through which medium can flow along the guide member portion 29b or the guide member 29a.

The second guide 30 has, similarly to the first guide 29, a guide member 30a which is cap-like in this instance and which extends transversely axially and in this case is in the form of a guide sleeve, and which has a guide member portion 30b which is arranged in a transversely axial plane and in which a central (axially extending) guide member through-opening 30c, through which the closure member 25 extends, is located.

The closing force on the closure member 25 is applied by a pressure spring 32 which is arranged at the other side of the medium channel 20 and which is supported, on the one hand, on a support face 34 of the housing 21 and which, on the other hand, presses against a plate-like portion 35 of the closure member 25.

The opening force is generated by the electromagnet 26, the core or armature of which forms an armature portion 33 which is in the form of a metal component and which is connected in a rotationally secure manner to the closure member 25. In specific terms, the closure member 25 is guided through a central hole of the armature portion 33 and, cf. above, through the guide through-opening 30c of the cap-like guide member 30a. The cap-like guide member 30a is positioned on the armature portion 33 with abutment against the armature portion 33 and is secured at that location by means of a nut 51 which is screwed onto a terminal thread portion 48 of the closure member 25.

The second guide 30 further has a hollow-cylindrical wall 49a, which is formed by the housing 21 of the valve 10, of a hollow-cylindrical recess 49 inside the housing 21, which wall surrounds the guide member 30a, in particular a cylindrical guide member face 30d thereof, with little spacing. During the axial back and forth movements, which are brought about by the electromagnet 26, of the closure member 25, the guide member 30a and consequently also the closure member 25, which is connected thereto in a rotationally secure manner, is then guided radially through the or along the hollow-cylindrical wall 49.

The medium channel 20 is delimited at the end thereof facing away from the valve seat 22 by a wall 37 which extends in a transversely axial plane. The closure member 25 is guided out of the medium channel 20 through a through-opening 38 in this wall 37.

In order to seal the region between the closure member 25 and the wall 37 which surrounds the closure member 25, a bellows 39 made of metal is provided.

To this end, the bellows 39 is connected, on the one hand, in a fluid-tight manner to the wall 37 which surrounds the through-opening 38, that is to say, in this case (laser) welded. In this case, the wall 37 is part of a bellows receiving member 43, which is arranged in the housing 21, for the bellows 39.

In specific terms, a first part-piece, that is to say, a first hollow-cylindrical end piece 40 of the bellows 39, is connected at the outer side to a corresponding circumferential (axial) connection face 41 which surrounds the through-opening 38 radially and which extends coaxially relative to the end piece 40.

On the other hand, the bellows 39 is connected in a fluid-tight manner to the bellows 39. In specific terms, a second part-piece, that is to say, a second hollow-cylindrical end piece 42, of the bellows 39 is connected to a particularly circumferential outer face of the closure member 25, particularly also (laser) welded. The bellows 39 is accordingly also moved thereby during each opening and closing movement of the closure member 25.

As shown in FIGS. 3-6, the bellows 39 covers or surrounds a particularly rod-shaped part-piece of the closure member 25 in this case, which part-piece extends in the medium channel 20 as far as a location in the through-opening 38 or the closure member 25/the part-piece thereof is arranged inside the bellows 29.

Now, it is particularly important, as already mentioned in the introduction, that production-related longitudinal tolerances in the (axial) longitudinal dimension of the bellows 39 can lead to high, undesirable forces, which reduce the service-life thereof, being able to be introduced into the bellows 39 during operation of the valve 10 if they lead in the shown installation situation to the bellows 39 being pretensioned in an undesirably powerful manner.

In order to prevent this, this deviation is completely or partially compensated for.

To this end, a compensation means 44, which influences the relative axial position between the bellows 39 and the valve seat 22, is provided.

In the present case, this is a spacer piece 45 which is constructed in an annular manner in this case or is in the form of a spacer disk.

Figures 5, 6:
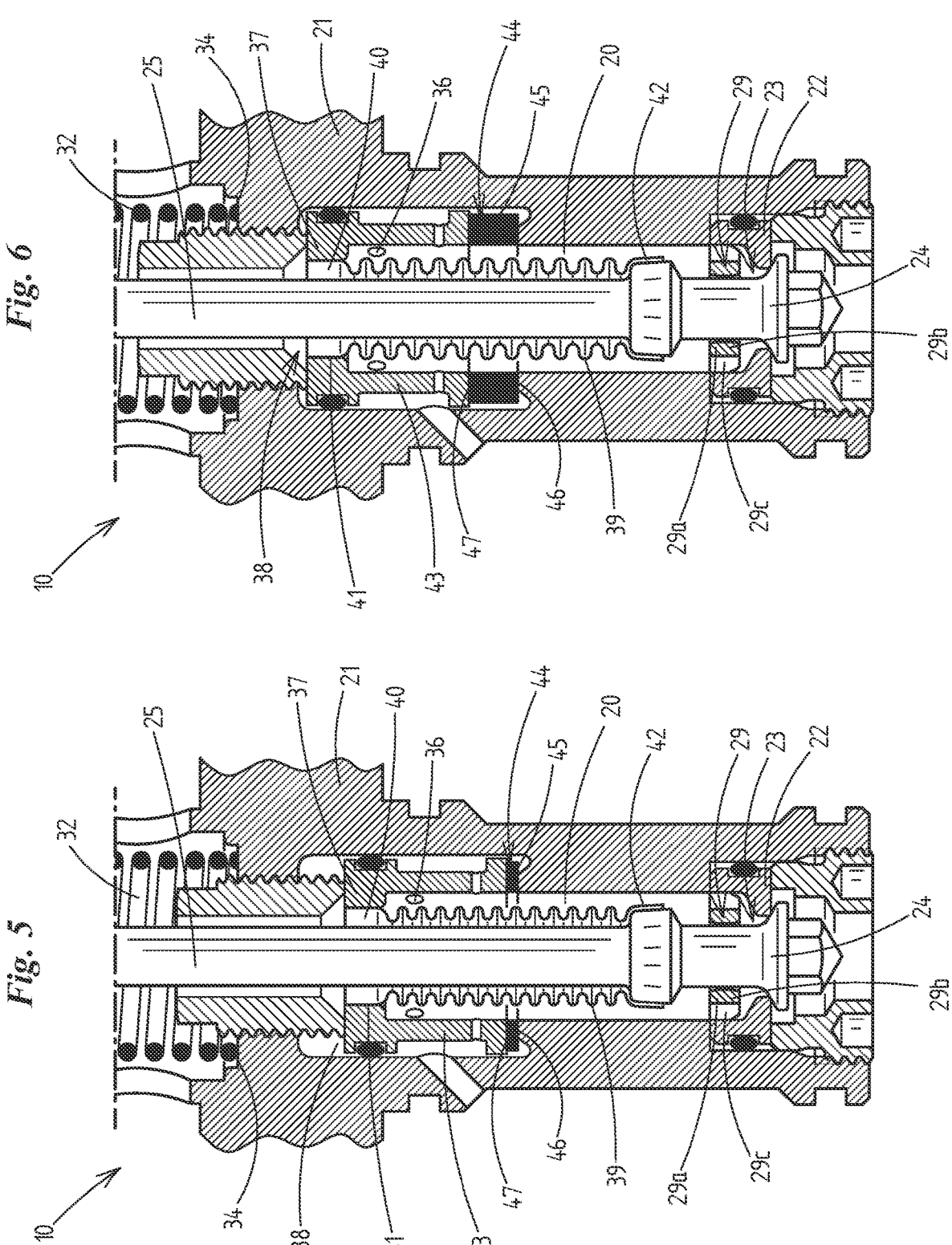
FIG. 5 shows a partial view of FIG. 3 as an enlarged illustration with a spacer piece with a first thickness.
FIG. 6 shows the partial view of FIG. 5 with a spacer piece with a second thickness.

As shown in FIGS. 5 and 6, the respective spacer piece 45 is arranged between a particularly circumferential support face or bearing face 46 (which is arranged in a transversely axial plane) of the housing 21, on which the bellows receiving member 43 is supported (axially in this case) and the bellows receiving member 43, in this case a support face 47, which is opposite the support face 46 of the housing 21, of the bellows receiving member 43.

Accordingly, the axial position of the bellows 39 is thereby influenced, in FIGS. 5 and 6 it is increased by the thickness of the spacer piece 45 with respect to a standard position without any such spacer piece 45, or the relative position is changed between the bellows 39, on the one hand, and the valve seat 21, on the other hand, that is to say, the relative spacing thereof is increased. As a result of the respective spacer piece 45, a respective production-related deviation of the actual length (shown in the Figures) of the bellows 39 from a desired length is compensated for.

As can be seen, in FIG. 6 the spacer piece 45 is selected to be thicker or the axial dimension thereof is selected to be greater than in the spacer piece 45 in FIG. 5 because the actual length of the bellows 39 which is used in FIG. 6 deviates in a correspondingly more powerful manner from a corresponding desired length than in the bellows 39 which is used in FIG. 5.

In this case, however, there may additionally be provision for adapting the individual components to each other so that the bellows 39 is fitted in the valve with a desired preten-sioning (which is substantially smaller in comparison with the above-mentioned undesirable pretensioning) so that in the shown closed position of the closure member 25 the bellows 39 applies to the closure member 25 an opening force which is directed counter to the closing force of the pressure spring 32 in order to support the subsequent open-ing movement which is brought about by the electromagnet 26, and so that the bellows 39 applies to the closure member 25 in the open position of the closure member 25 a closing force which is directed counter to the opening force of the electromagnet 26 in order to support the subsequent closing movement which is brought about by the pressure spring 32 if the opening force of the electromagnet 26 is dispensed with.

Figure 7:
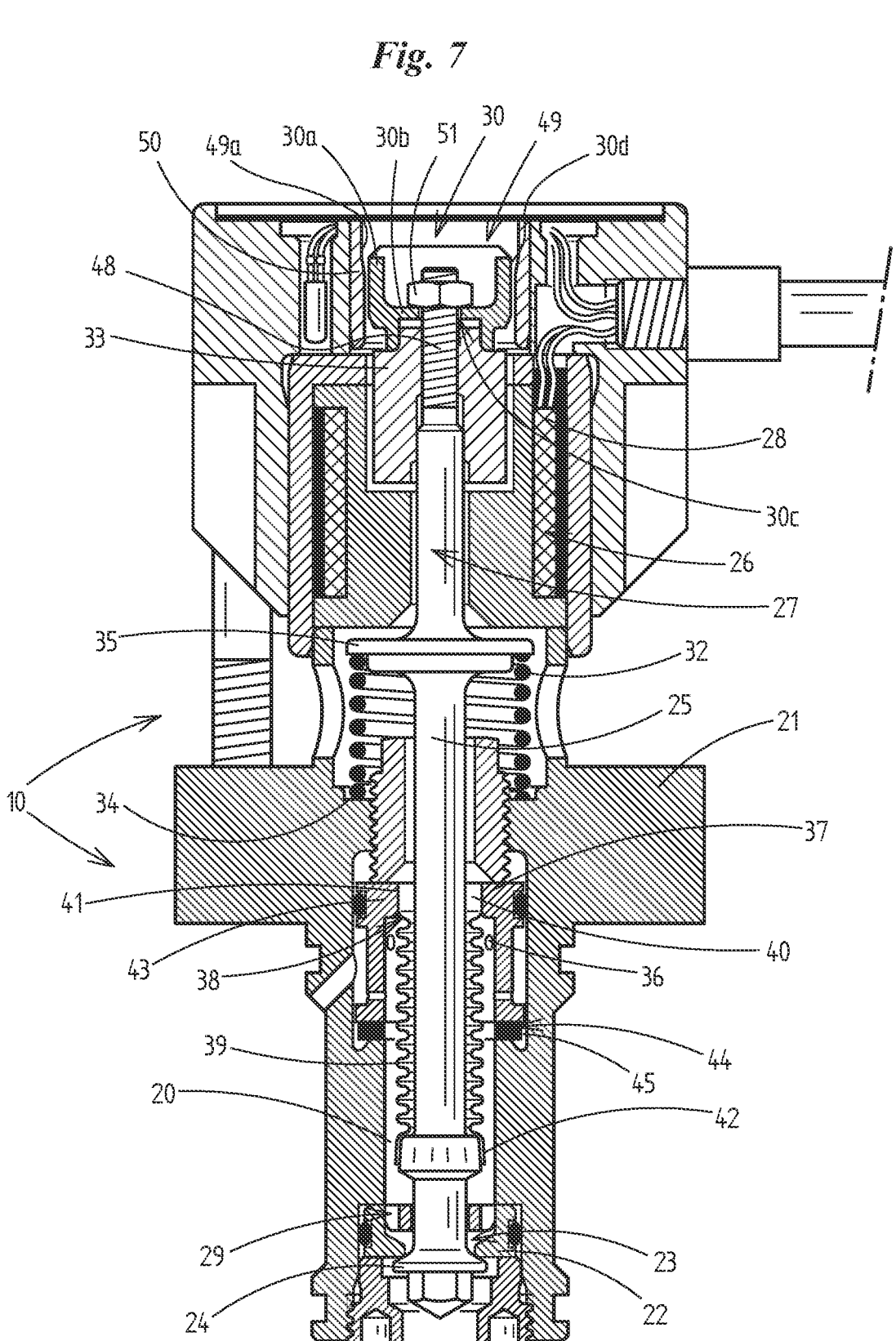
FIG. 7 shows a section similar to FIG. 3 through an alternative embodiment of an individual valve.

FIG. 7 shows an alternative to the individual valve 10 which is shown in particular in FIGS. 3-6. Identical com-ponents are indicated with the same reference numerals as in FIGS. 3-6.

As can be seen, the individual valve 10 of FIG. 7 differs only in the region of the second guide 30 of the closure member 25. This second guide 30 additionally has a fixed sliding bearing bush 50 which is hollow-cylindrical in this case and which is located in the hollow-cylindrical recess 49. The guide member 30a is located during the axial back and forth movements of the closure member 25 with sliding abutment against the sliding bearing bush 50 inside the bush, where applicable using a suitable lubricant or sliding means.

It has been shown that the use of such a sliding bearing bush 50 allows particularly long service-lives of the valve 10 or particularly many axial back and forth movements of the closure member 25 before substantial wear occurs.

The guide member 30a may preferably be made of high-grade steel, particularly from high-grade steel 1.4112 or a high-grade steel with comparable properties.

The fixed sliding bearing bush 50 may completely or partially comprise a copper alloy with or without aluminum, such as, for example, aluminum bronze, or completely or partially comprise steel or high-grade steel.

It is also conceivable for the fixed sliding bearing bush 50 to have a (an external) carrier layer or back layer made from steel or high-grade steel and a running layer (which is internal and which is directed toward the guide member 30a)

and which is made from a polymer. In this case, it is also conceivable for additional layers to be located between the back layer and the polymer layer, such as, for example, a bronze layer (where applicable made from sinter bronze).

Finally, FIG. 7 further shows a removable cover portion 52, via which the recess 49 and the components arranged therein are accessible.

LIST OF REFERENCE NUMERALS

10 Valve
11 Valve arrangement
12 Distributor member
13 Supply line to distributor member
14 Medium inlet of distributor member
15 Medium channel of distributor member
16 Nozzle
17 Discharge opening of nozzle
18 Nozzle channel
19 Medium channel of distributor member
20 Medium channel of valve
21 Housing
22 Valve seat
23 Discharge opening of valve seat
24 Closure piece
25 Closure member
26 Electromagnet
27 Internal coil space
28 Coil
29 First guide
29a Guide member
29b Guide member portion
29c Guide member through-opening
29d Through-openings for medium
30 Second guide
30a Guide member
30b Guide member portion
30c Guide member through-opening
30d Cylindrical guide member face
32 Pressure spring
33 Metal component
34 Support face
35 Plate-like portion
36 Inlet openings in medium channel
37 Wall of bellows receiving member
38 Through-opening
39 Bellows
40 First end piece of bellows
41 Axial connection face of through-opening
42 Second end piece of bellows
43 Bellows receiving member
44 Compensation means
45 Spacer piece
46 Support face of housing
47 Support face of bellows receiving member
48 Thread portion
49 Hollow-cylindrical recess
49a Hollow-cylindrical wall
50 Sliding bearing bush
51 Nut

The invention claimed is:

1. A valve for flowable media, in particular for fluid adhesive or glue, comprising:
   a valve housing (21);
   a medium channel (20);
   a controllable actuator;
   a valve seat (22);

a discharge opening (23) connected to the medium chan-
nel (20);

a bellows (39) which is elongated in structure;

a sealing element which is in the form of a hollow
member and which is a part-piece of the bellows (39);

a compensation means (44) which is in the form of an
annular spacer piece (45); and a closure member (25) which is arranged in the valve
housing (21) and which is elongated in structure, wherein the closure member (25) can be axially moved in
the medium channel (20) of the valve by the control-
lable actuator and which in a closed position abuts the
valve seat (22) and closes the discharge opening (23)
and which is raised from the valve seat (22) in an open
position and is released from the valve seat (22), and
which is connected to the sealing element in order to
seal the medium channel (20), the sealing element
being movable in an axial direction during movements
of the closure member (25), wherein another part-piece of the bellows (39) is fixedly
supported in the valve, wherein the relative axial position between the bellows
(39) and the valve seat (22) is adapted to a production-
related deviation of the actual longitudinal dimension
of the bellows (39) used from a desired longitudinal
dimension, so that this deviation is completely or
partially compensated for, wherein the compensation means (44) has a thickness that
is selected to influence the relative axial position
between the bellows (39) and the valve seat (22), in
order to compensate for the deviation between the
actual longitudinal dimension of the bellows (39) and a
desired longitudinal dimension of the bellows (39), wherein the controllable actuator with which the closure
member (25) is axially movable comprises an electro-
magnet (26) with a coil (28), the core or armature of
which forms the closure member (25) or an armature
portion (33) which is connected to the closure member
(25), wherein the closure member (25) extends in the
valve housing (21) from an end of the closure member
(25) in abutment with the valve seat (22) in the closed
position, through the medium channel (20) and through
the space which is surrounded by the coil (28), as far as
a region at the other side of the coil (28).

2. The valve as claimed in claim 1, wherein the compen-
sation means (44) is arranged between a receiving member
(43), which is arranged in the valve housing (21) and which
is connected to the bellows (39) in a fluid-tight manner, for
the bellows (39) and a support face which is particularly
circumferential, of the valve housing (21) or in the valve
housing (21), on which support face the receiving member
(43) is supported or is borne.

3. The valve as claimed in claim 1, wherein the bellows
(39) is arranged in the medium channel (20) coaxially
relative to a, particularly rod-shaped, part-piece, which is
arranged in the medium channel (20), of the closure member
(25).

4. The valve as claimed in claim 3, wherein the part-piece
of the closure member (25) is arranged in the internal
bellows space of the bellows (39).

5. The valve as claimed in claim 1, wherein the medium
channel (20) is delimited at one end, which is remote from
the valve seat (22), by a wall (37) which particularly extends
in a transversely axial manner and in which a through-
opening (38), along which the closure member (25) is
guided out of the medium channel (20), is constructed,
wherein, in order to seal the region between the closure member (25) and the wall (37), which surrounds it, of the
through-opening (38), the bellows (39) surrounds a particu-
larly rod-shaped part-piece of the closure member (25)
which is arranged in the medium channel (20) and which
extends at least as far as the through-opening (38), wherein
the fixedly supported part-piece of the bellows (39), that is
to say, a first, particularly hollow-cylindrical end piece
thereof, is connected in a fluid-tight manner to a particularly
circumferential connection face, which is associated with
the through-opening (38), of the wall (37), and wherein the
part-piece, which is connected to the closure member (25),
of the bellows (39), that is to say, a second, particularly
hollow-cylindrical end piece thereof, is connected in a
fluid-tight manner to a particularly circumferential outer
face of the closure member (25).

6. The valve as claimed in claim 5, wherein the circum-
ferential connection face of the wall (37), to which the first
end piece of the bellows (39) is connected in a fluid-tight
manner, radially surrounds the through-opening (38) and in
particular it extends coaxially relative to the first end-piece.

7. The valve as claimed in claim 6, wherein the second
end-piece of the bellows (39) externally abuts a circumfer-
ential connection face of the particularly rod-shaped part-
piece of the closure member (25) and is connected thereto in
a fluid-tight manner.

8. The valve as claimed in claim 7, wherein the fluid-tight
connection of the first end piece of the bellows (39) to the
connection face of the wall (37) and/or the connection of the
second end piece of the bellows (39) to the part-piece of the
closure member (25) is a laser welding connection.

9. The valve as claimed in claim 5, wherein the particu-
larly transversely axially extending wall (37) is a wall (37)
of the bellows receiving member (43), and/or in that the
through-opening (38) extends coaxially relative to the par-
ticularly rod-shaped part-piece of the closure member (25)
which is guided through the through-opening (38).

10. The valve as claimed in claim 2, wherein the bellows
receiving member (43) is integrally connected to the valve
housing (21), or in that the bellows receiving member (43)
is a separate component which is arranged in the valve
housing (21).

11. The valve as claimed in claim 1, wherein, in the closed
position of the valve, the bellows (39) is positioned under
pretension in the medium channel (20).

12. The valve as claimed in claim 1, wherein a closing
force member of the valve applies in the closed position of
the valve a closing force, which acts in the direction of the
valve seat (22), to the closure member (25).

13. The valve as claimed in claim 12, wherein the bellows
(39) applies to the closure member (25) in the closed
position of the valve in order to support a subsequent
opening movement, which is brought about by the opening
force of an opening force member, an additional opening
force which is brought about particularly by the pretension-
ing and which acts counter to the closing force and which is
smaller with respect thereto.

14. The valve as claimed in claim 1, wherein an opening
force member of the valve applies to the closure member
(25), in an open position of the valve, an opening force
which is particularly directed counter to the closing force of
a or the closing force member.

15. The valve as claimed in claim 14, wherein the bellows
(39) applies an additional closing force, which is directed
counter to the opening force and which is brought about in
particular by the pretensioning and which is smaller than the
opening force, in order to support a subsequent closing movement, which is brought about by the closing force member of the valve, of the closure member (25).

16. The valve as claimed in claim 1, wherein a tension-free state of the bellows (39) which also moves with the closure member (25) is produced at an open position of the closure member (25) corresponding to half the travel length of the closure member (25).

17. The valve as claimed in claim 1, wherein the wall of the bellows (39) is constructed with multiple layers.

18. The valve as claimed in claim 1, wherein the closure member (25) is radially guided with at least two guides (29, 30), that is to say, on the one hand, with a first guide (29) which is arranged adjacent to the valve seat (22) in the medium channel (20) and, on the other hand, with or by means of a second guide (30) which is arranged in the region at the other side of the coil (28).

19. The valve as claimed in claim 18, wherein the first guide and/or the second guide (29, 30) has/have a guide member having a preferably disk-like, transversely axially extending guide member portion, in which a (an axial) guide member through-opening, through which the closure member (25) extends, is located.

20. The valve as claimed in claim 19, wherein the transversely axially extending guide member portion of the guide member of the first guide (29) has one or more additional axial through-openings, through which medium of the medium channel (20) can flow in the direction of the valve seat (22).

\* \* \* \* \*